United States Patent [19]

Serrano

[11] Patent Number: 4,536,618
[45] Date of Patent: Aug. 20, 1985

[54] TELEPHONE LINE INTERFACE

[75] Inventor: Arthur L. Serrano, Canoga Park, Calif.

[73] Assignee: Novation, Inc., Chatsworth, Calif.

[21] Appl. No.: 541,986

[22] Filed: Oct. 14, 1983

[51] Int. Cl.³ .............................................. H04M 1/72
[52] U.S. Cl. .................................. 179/84 R; 179/6.16
[58] Field of Search ............... 179/84 R, 84 A, 84 C, 179/89, 18 FA, 18 HB, 6.16, 6.13, 2 C, 2 DP

[56] References Cited

U.S. PATENT DOCUMENTS 3,603,740  9/1971  Cambridge .................... 179/84 T X
4,390,752  6/1983  Jacobson ...................... 179/84 R X

*Primary Examiner*—Gene Z. Rubinson
*Assistant Examiner*—James L. Dwyer
*Attorney, Agent, or Firm*—Blakely, Sokoloff, Taylor & Zafman

[57] ABSTRACT

A telephone line interface for direct connect telephone line connections characterized by low cost and minimal package size requirements. The telephone line interface utilizes a small signal transformer with a primary winding couplable to the line by actuation of a relay. A secondary winding of the transformer is coupled to an integrated circuit which performs the functions of ring detect and dial tone detect, and separation of the received signal and the transmit signal when transmitting and receiving simultaneously. Ring signal detection on the secondary side of the coupling transformer substantially reduces the size and cost of the ring detect circuitry, as the secondary of the transformer may be provided with over-voltage protection, whereas the line side of the transformer must survive particularly high surge voltages, thereby requiring high voltage isolation not obtainable by way of conventional integrated circuits. Other aspects and features of the invention are disclosed.

8 Claims, 1 Drawing Figure

TELEPHONE LINE INTERFACE

BACKGROUND OF THE INVENTION

1. Field of the Invention.

The present invention relates to the field of telephone line interfaces.

2. Prior Art.

In telephone systems a typical unused telephone line is maintained at a DC voltage on the order of 50 volts. When a call is to be made, an off-hook signal is communicated to the central office by the originating telephone (or other device coupled to the phone line). The off-hook signal is merely comprised of a line current exceeding a predetermined threshold, typically on the order of 20 milliamps, generated by switching a substantial load on the line at the originating unit. The central office, sensing the increase in line current, responds with a relatively low level, moderate frequency dial tone, which the originating caller (human or electronic device) recognizes and responds to, typically by providing the appropriate touch tone signals on the line to identify the unit being called. Assuming the unit being called is not being used, the line for that unit will of course be at approximately 50 volts DC also. The central office then imposes a relatively high voltage low frequency AC ring signal on the line to the unit being called. The ring signal, which generally is substantially below the normal audio frequency range of the telephone, may have a frequency anywhere in the range of 16 to 68 Hz. Finally, when the called unit goes off hook, signaled by the switching of a substantial load across the phone lines by the answering or called unit, the central office will connect the calling and called unit for so long as the call continues. Completion of the call is signaled by either unit effectively going back on hook, as signaled by the removal of the load on the line at the unit going back on hook, at which time the central office will drop the line connection.

Though the bandwidth of a conventional telephone system may vary somewhat depending on the system, the bandwidth of the usual system is not very broad, as good intelligible voice reproduction will be achieved if the band is on the order of 500 to 3500 Hz, or even less. Generally speaking the dial tone and touch tones are well within this frequency range, and accordingly can be processed by at least some of the same circuits used for processing of transmitted or received signals. The ring signal frequency, however, may be only a small fraction of the lower end of the band pass of the system.

A common method of directly coupling to a phone line and imposing the required load on the line to provide an off-hook signal is to couple the primary of a small transformer to the line by a small relay. The transformer is characteristically designed to have a sufficiently low DC resistance to provide the required load on the line without substantial saturation, so that frequencies within the pass band of the phone system may be coupled to and from the line through the transformer. The ring signal, however, being of a particularly high voltage and low frequency, does not pass such transformers to any substantial extent. For this reason, characteristically prior art systems with an automatic answer capability, such as by way of example, data sets and the like, wherein the existence of a ring signal on a phone line has to be electronically detected, utilized ring detect circuitry coupled directly to the phone line rather than to the secondary of the coupling and off-hook load transformer. Because of this, such circuitry must be capable of operating at relatively high voltages for prolonged periods of time since, as stated before, phone lines are normally maintained at approximately 50 volts DC between calls. Beyond this however, the prior art ring detect circuitry must also withstand very high momentary voltages resulting from weather disturbances and the like, all of which, of course, require that the ring detect circuitry also provide DC isolation from the line so as to eliminate possible shock hazards. For this reason, prior art ring detect circuitry could not be provided in integrated circuit form, but instead, such circuitry was generally in discreet component form and included an optoisolator to provide the desired DC isolation. While such circuitry functions well, it is relatively expensive and large because of the component count, the size and cost of the optoisolator and the circuit board area these components require.

BRIEF SUMMARY OF THE INVENTION

A telephone line interface for direct connect telephone line connections characterized by low cost and minimal package size requirements. The telephone line interface utilizes a small signal transformer with a primary winding couplable to the line by actuation of a relay. A secondary winding of the transformer is coupled to an integrated circuit which performs the functions of ring detect and dial tone detect, and separation of the received signal and the transmit signal when transmitting and receiving simultaneously. Ring signal detection on the secondary side of the coupling transformer substantially reduces the size and cost of the ring detect circuitry, as the secondary of the transformer may be provided with over-voltage protection, whereas the line side of the transformer must survive particularly high surge voltages, thereby requiring high voltage isolation not obtainable by way of conventional integrated circuits. Other aspects and features of the invention are disclosed.

DETAILED DESCRIPTION OF THE INVENTION

Figure 1:
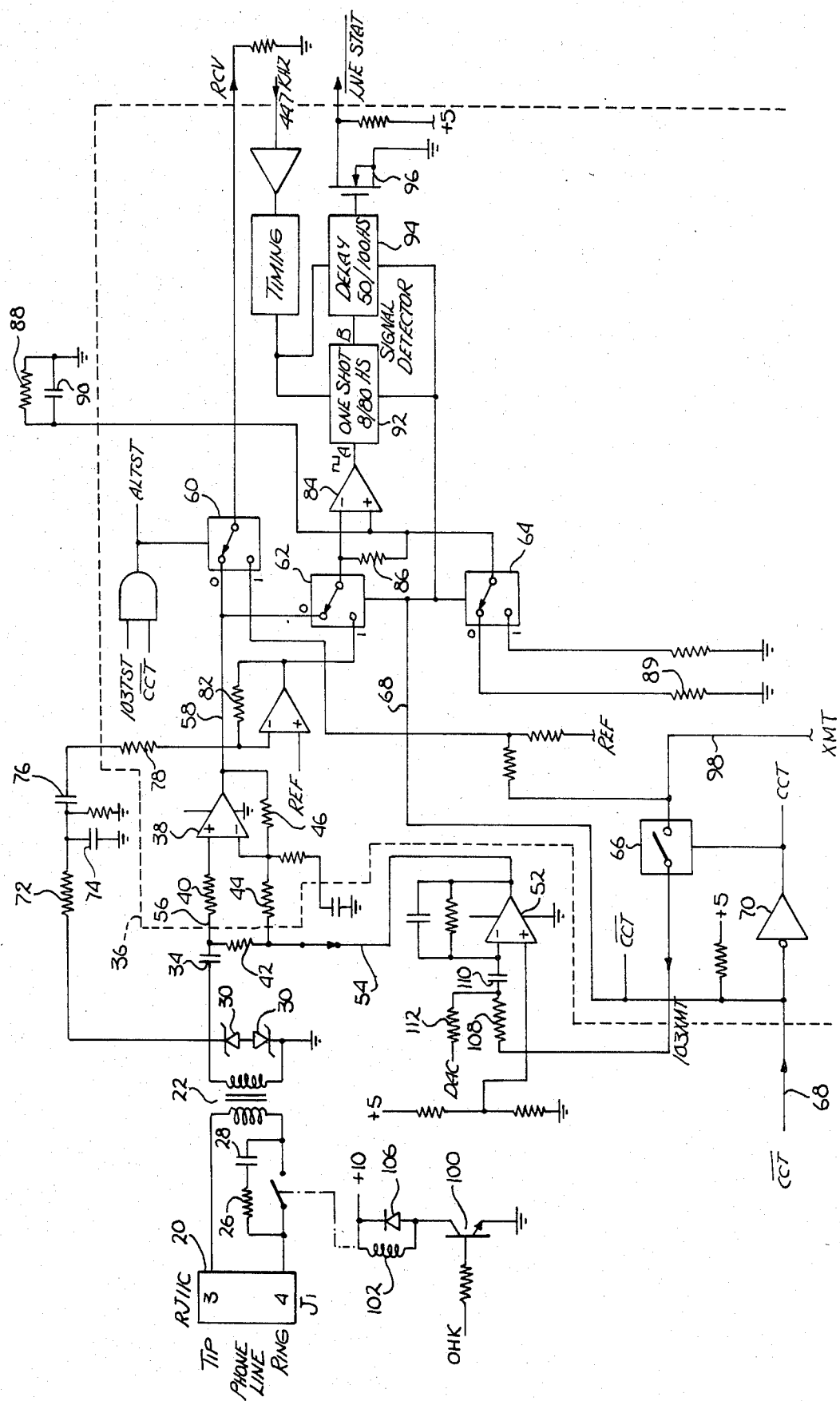
FIG. 1 is a circuit diagram for the preferred embodiment circuit of the present invention.

The circuit of the preferred embodiment of the present invention may be seen in FIG. 1. The circuit shown is coupled to the phone line through a modular jack 20. The tip line of the modular jack 20 is coupled to one side of the primary of the load and coupling transformer 22, with the other side of the primary of the transformer being couplable through relay switch 24 to the ring line. The series connection of resistor 26 and capacitor 28 comprising an open line load means is coupled to the normally open relay switch connections to provide an open line load consistent with FCC requirements and to protect the relay contacts.

Typically resistor 26 is on the order of 6.8 K ohms and capacitor 28 is on the order of 0.47 uf, whereas the primary impedance of the transformer is on the order of 600 ohms and normally considered too low to be driven by a ring signal through resistor 26 and capacitor 28 to provide meaningful coupling to the secondary. It should be noted that the relay and resistor 26 and capacitor 28 are the only components on the phone line side of transformer 22. The secondary of the transformer, on the other hand, may be protected by a pair of back-to-back zeners 30 which limit the secondary voltage to the value consistent with integrated circuit voltage capabilities. In this embodiment, resistor 42 provides a predetermined resistive AC load on the line as seen by the line itself, as well as the rest of the circuitry shown in FIG. 1, with coupling capacitor 34 coupling the secondary voltage (AC) to the circuit shown within the dashed enclosure 36, in the preferred embodiment part of a custom integrated circuit.

Capacitor 34 is coupled to the positive input of amplifier 38 through resistor 40 and also to the negative input of that amplifier through resistors 42 and 44. The output of amplifier 38 is also coupled to the negative input of the amplifier through feedback resistor 46. Finally, the negative input of amplifier 38 is also coupled to ground through resistor 48 and capacitor 50, the combination having a corner frequency of approximately 50 Hz in the preferred embodiment.

It will be noted that the output of amplifier 52 is coupled to the junction between resistors 42 and 44 as shall be subsequently described. Amplifier 52 is coupled to provide the transmit data for coupling through capacitor 34 and coupling transformer 22 to the phone line. In comparison to resistors 40, 44 and 46, resistor 42 is preferably a rather low value resistor (approximately 600 ohms) to approximately match the phone line AC load.

Assuming for the moment that no data signal is being received from the phone line, but that amplifier 52 is providing a data output signal (a frequency shift keyed or other AC data signal) onto line 54 for coupling to the phone line, it will be noted that resistor 42 in combination with the phone line AC load impedance will act as a voltage divider so that the voltage on line 56 will be on the order of one-half of the voltage on line 54. In that regard, the impedance of coupling capacitor 34 at the signaling frequencies will be low in comparison to the resistance of resistor 42 and the phone line impedance. Similarly, capacitor 50 will have a low impedance in comparison to resistor 48 at the signaling frequencies. Thus it may be seen that the signal to be transmitted on line 54 will be coupled through transformer 22. At the same time the signal on line 54 will be coupled through resistor 44, with an equivalent signal of approximately half of the amplitude of the signal on line 54 being coupled to resistor 40. It can be shown that by appropriate selection of resistors 44, 46 and 48 in comparison to resistor 42 and the AC phone line load (and other impedances effectively in parallel with resistor 42) substantially no part of the signal on line 54 will appear at the output of amplifier 38 on line 58. In essence, while approximately twice the signal is coupled to resistor 44 as is coupled to resistor 40, the voltage applied to resistor 44 is effectively divided down by resistors 46 and 48 by a predetermined amount so that the differential input voltage to amplifier 38 caused by a transmit signal on line 54 is substantially zero. On the other hand, assuming that there is no signal on line 54 to be transmitted, line 54 will effectively be an AC ground. In this case, a signal received from the phone line and coupled through capacitor 34 will be applied through resistor 40 to the positive input of amplifier 38. However, at the same time a corresponding signal is not applied through resistor 44 because of line 54 constituting an AC ground. Thus there is a high differential input to amplifier 38 from signals received over the phone line, with resistors 44, 46 and 48 providing a feedback network to control the gain of the amplifier. Since the system effectively is a linear system (operating below the zener voltage of zeners 30) the principle of superposition applies (see book entitled "Information Transmission, Modulation, and Noise" by Mischa Schwartz (Mc Graw Hill Book Company), specifically page 54 of the Third Edition for the definition and characteristics of a linear system, as the word linear is used herein), so that amplifier 38 and its associated networks will provide separation of the incoming and outgoing signals, whereby only the receive signal appears on line 58. This, of course, is coupled through switch 60 to provide the RCV signal at the output of the integrated circuit.

In the preferred embodiment the coupling capacitors, the coupling transformer, etc., are selected so that the receive signal RCV will be responsive to frequencies in the range of 300 to 3 KHz. As a result, dial tones (and for that matter, touch tones) will be detected and/or reproduced on line 58 without substantial distortion.

It will be noted from FIG. 1 that in addition to switch 60, there are additional switches 62, 64 and 66, with switches 62 and 64 being controlled by the inverse of a coupler cut-through signal $\overline{CCT}$ on line 68, and switch 66 being controlled by the coupler cut-through signal CCT generated by the inversion of the signal $\overline{CCT}$ by inverter 70. In the quiescent auto/answer state, switches 60, 62, 64 and 66 are in the opposite state from that shown in the figure. Also, of course, the relay switch 24 is open as shown, with the relatively high quiescent line voltage being blocked by capacitor 28, and DC isolation for the circuit on the secondary of the coupling transformer being provided by the transformer itself. Even with relay switch 24 open however, it has been found that there is sufficient coupling through the transformer primary, capacitor 28 and resistor 26 to provide a detectable ring signal on the secondary of the transformer. Thus, with the present invention, the presence of the ring signal is detected on the secondary side of the coupling transformer 22, whereby the cost as well as the circuit board area of the opto couplers used in the prior art can be avoided. In particular, with relay 24 open as shown and without any opto coupler or any other circuitry separately connected to the tip and ring lines for ring detection and line voltage isolation, the ring signal is coupled through the transformer 22 to appear as a detectable ring signal, albeit low voltage, on the secondary of the transformer. This signal is coupled through the low pass filter comprised of resistor 72 and capacitor 74, and through the coupling capacitor 76 and summing resistor 78 to the input of amplifier 80, having a gain set principally by resistor 78 and feedback resistor 82. The low pass filter comprised of resistor 72 and capacitor 74 effectively blocks communication signals, or at least substantially attenuates such signals because of the higher frequencies characteristic thereof, but substantially passes the ring signals which are generally in the frequency range of 16 to 68 hertz. Also the 6 db/octave rolloff of the low pass filter generally compensates for the 6 db/octave increase in output of transformer 22 in the range of 16 to 68 hz, thereby providing a relatively constant output of amplifier 80 independent of the frequency of a particular ring signal.

It will be noted that the positive input to differential amplifier 80 is connected to a reference voltage whereas the negative input is connected to the DC isolated input resistor 78 and feedback resistor 82. Accordingly, the reference voltage of the positive input of amplifier 80, among other things, sets the DC level of the output of the amplifier, which is coupled through switch 62 (in the opposite state when looking for a ring detect) to amplifier 84 coupled as a zero crossing detector. In particular, the inverting input of amplifier 84 is coupled by switch 62 directly to resistor 82, with the combination of resistor 86 and resistor 88 connected through switch 64 during ring detect providing a voltage divider to divide the input for the non-inverting input of amplifier 84, and capacitor 90 providing filtering on the non-inverting input. It will be noted that a minimum level or threshold of signal in the ring signal frequency range is required to trigger the zero crossing detector, as the reference voltage applied to the non-inverting input to amplifier 80 establishes a DC offset for the input to the zero crossing detector.

A ring signal on the phone line will provide a low frequency square wave output for the amplifier 84 which is detected by the one shot 92, and after a suitable delay to be assured that it is a ring signal being detected, the output of the one shot 92 is detected by the delay circuit 94 to turn on device 96, pulling the signal $\overline{\text{LNE STAT}}$ low to indicate a ring detect. In that regard, the time duration of the one shot 92 and the delay of the delay circuit 94 are controllable, with the one shot preferably having a duration of approximately 80 milliseconds and the delay having a delay of approximately 200 milliseconds for ring detect. The 80 millisecond period of the one shot assures that each cycle of the ring signal will re-initiate the one shot before it resets so that the ring signal will provide a constant output of the one shot. The delay on the other hand assures that a number of ring cycles have been detected to prevent a false ring detect as a result of momentary noise on the line.

On detection of a ring signal a carrier cut through signal $\overline{\text{CCT}}$ is generated to close switch 66 and change switches 60, 62 and 64 to the positions shown in the figure. An off-hook signal OHK is coupled to transistor 100 to turn it on, causing the collector of the transistor to go low to energize the coil 102 of relay 24 to close the relay (diode 106 providing a reverse current path to suppress the back EMF of the coil during turnoff of the transistor). Also a signal on line 98 will be AC coupled to the inverting input of amplifier 52 through resistor 108 and capacitor 110, with the output of amplifier 52 being coupled to line 54, and thus to the phone line as hereinbefore described, signal on line 54 however not being coupled to make up a part of the RCV output signal. As an alternative coupling, for Touch-Tone dialing, a digital converter may be coupled through resistor 112 to provide the input for amplifier 52 for coupling Touch-Tones to the phone line.

In an auto/dial mode the interface of FIG. 1 goes off hook by a signal on line 98 closing relay 24, with the dial tone being coupled to transformer 22 through amplifier 80 and switch 62 and amplifier 84. (For dial tone detect, switch 64 is in a position to couple resistor 89 in circuit to reset the response of amplifier 84). The timing characteristics of the one shot and the delay are switched in this condition so that the one shot preferably has a duration of approximately 8 milliseconds and the delay of approximately 50 milliseconds, the shorter time constants being compatible with the characteristically higher frequency of dial tones. Again the output of the relay circuit 94 turns on device 96 pulling the $\overline{\text{LNE STAT}}$ signal low to indicate dial tone detection.

There has been described a new and unique ring signal detect circuit which allows the detection of a ring signal on a telephone line without any connection of special ring detect circuitry directly to the phone lines, such as by way of example, the prior art opto couplers commonly used for this purpose. The elimination of the opto coupler of course, has definite advantages in that it results in an overall cost reduction and also results in a significant reduction in the physical size of the circuit required. In that regard, is previously mentioned the circuit within the dashed line of FIG. 1 is preferably fabricated in integrated circuit form so that substantially all the functions are achieved within that integrated circuit. The invention performs the desired function in part by providing the low pass filtering on the output of the secondary of transformer 22 to eliminate or at least grossly attenuate higher frequency noise which may be on the line to allow substantial amplification of the low frequency signal for detection. Actually in that regard, while resistor 72 and capacitor 74 function as a low pass filter, capacitor 76 and resistor 78 provide a very low frequency cutoff, and a flattening of the overall response of the system to a ring signal anywhere in the 16 to 68 hz band of typical ring signals so that the entire network may be considered as a band pass filter having a band pass within the expected or predetermined ring signal frequency band. In that regard, it is important that the frequencies outside of the normal ring frequency band be heavily attenuated, even if some frequencies within the normal ring signal frequency band are also somewhat attenuated, as these signals may be amplified, and the detection circuit used for the present invention s a zero crossing detection circuit operative with any reasonable amplitude of the detected ring frequency signal. To that end, the time constant of resistor 72 and capacitor 74 in one embodiment of the present invention is on the order of 0.03 seconds and the time constant of resistor 78 and capacitor 76 is on the order of 1.5 seconds. Obviously the parameters identified herein as well as the detailed circuits shown may readily be varied by one skilled in the art without changing the spirit and scope of the invention.

I claim:

1. Apparatus for detecting the ring signal on first and second telephone lines comprising;
    a coupling transformer having a primary winding and a secondary winding, each having at least two leads thereon,
    a switch means for controllably changing between open and closed conditions to provide electrical conduction between first and second switch contact means when in said closed condition, said first switch contact means being a means for connection to the first telephone line, said second switch contact means being coupled to said first primary lead for said coupling transformer, said second primary lead of said coupling transformer including means for coupling to the second telephone line,
    open line load means coupled between said first and second switch contact means for providing a predetermined linear load on the phone lines when said switch means is open, and
    ring signal sensing means coupled to said first and second secondary leads of said coupling transformer for sensing the presence of a ring signal on the telephone lines when said switch means is open, said ring signal sensing means including filter means for attenuating signals not within the predetermined frequency range of the ring signal, and sensing means coupled to said filter means for sensing the presence of an output of said filter means within the predetermined frequency range of the ring signal and providing a ring detect output signal in response thereto.

2. The apparatus of claim 1 wherein said sensing means includes a threshold means whereby said sensing means will sense the presence of an output of said filter means within the predetermined frequency range of the ring signal and provide a ring detect output signal in response thereto when the output of said filter means exceeds a predetermined threshold.

3. The apparatus of claim 1 wherein said filter means includes means to compensate for the variation of the output of said coupling transformer with frequency within the expected frequency range of typical ring signals.

4. Apparatus for detecting the ring signal on first and second telephone lines comprising;
a coupling transformer having a primary winding and a secondary winding, each having at least two leads thereon,
a switch means for controllably changing between open and closed conditions to provide electrical conduction between first and second switch contact means when in said closed condition, said first switch contact means being a means for connection to the first telephone line, said second switch contact means being coupled to said first primary lead of said coupling transformer, said second primary lead of said coupling transformer including means for coupling to the second telephone line,
open line load means coupled between said first and second switch contact means for providing a predetermined linear load on the phone lines when said switch means is open, and
ring signal sensing means coupled to said first and second secondary leads of said coupling transformer for sensing the presence of a ring signal on the telephone lines when said switch means is open and providing a ring detect output signal in response thereto, said ring signal sensing means being frequency and threshold selective to respond primarily to signals within the predetermined frequency range of ring signals and of at least a predetermined amplitude.

5. The apparatus of claim 4 wherein said ring signal sensing means includes frequency selective means for substantially compensating for the frequency dependence of the output of said coupling transformer 6. Apparatus for detecting the ring signal on first and second telephone lines comprising;
a coupling transformer having a primary winding and a secondary winding, each having at least two leads thereon,
a switch means for controllably changing between open and closed conditions to provide electrical conduction between first and second switch contact means when in said closed condition, said first switch contact means being a means for connection to the first telephone line, said second switch contact means being coupled to said first primary lead for said coupling transformer, said second primary lead of said coupling transformer including means for coupling to the second telephone line,
open line load means coupled between said first and second switch contact means for providing a predetermined linear load on the phone lines when said switch means is open,
filter means coupled to said first and second secondary leads of said coupling transformer, said filter means being a means for providing a filter means output primarily responsive to signals within the predetermined frequency range of ring signals received from said coupling transformer,
threshold means coupled to said filter means for imposing a predetermined threshold level on the output of said filter means,
zero crossing detector means coupled to said threshold means for detecting zero crossings in the signal received therefrom and for providing a square wave output in response thereto, and
output means coupled to said zero crossing detector means for detecting the square wave output and providing a ring signal detection signal in response thereto.

7. The apparatus of claim 6 wherein said output means is a frequency sensitive means for detecting a square wave of particular frequencies.

8. The apparatus of claim 6 wherein said filter means includes a means to compensate for the variation of the output of said coupling transformer with frequency within the expected frequency range of typical ring signals.

* * * * *